United States Patent
Mikiya et al.

(10) Patent No.: US 6,792,974 B2
(45) Date of Patent: Sep. 21, 2004

(54) FLUID COUPLER (75) Inventors: Toshio Mikiya, Tokyo (JP); Hiroyuki Kitagawa, Tokyo (JP)

(73) Assignee: Nitto Kohki Co., Ltd., Tokyo (JP)

( * ) Notice: Subject to any disclaimer, the term of this patent is extended or adjusted under 35 U.S.C. 154(b) by 0 days.

(21) Appl. No.: 10/690,640

(22) Filed: Oct. 23, 2003

(65) Prior Publication Data

US 2004/0079423 A1 Apr. 29, 2004

(30) Foreign Application Priority Data

Oct. 25, 2002 (JP) ........................................ 2002-311774

(51) Int. Cl.$^7$ .............................................. F16L 37/34
(52) U.S. Cl. ................................................ 137/614.03
(58) Field of Search ..................... 137/614.03, 614.04, 137/614.05, 614

(56) References Cited

U.S. PATENT DOCUMENTS

| | | | |
|---|---|---|---|
| 4,865,292 A | | 9/1989 | Ekman |
| 4,949,745 A | * | 8/1990 | McKeon ..................... 137/614 |
| 5,076,325 A | * | 12/1991 | Ekman .................. 137/614.03 |
| 5,855,227 A | | 1/1999 | Stucchi |
| 5,884,897 A | | 3/1999 | Arosio |
| 6,179,001 B1 | * | 1/2001 | Schutz .................. 137/614.03 |

FOREIGN PATENT DOCUMENTS

| JP | 08-054089 | 2/1996 |
|---|---|---|
| JP | 11-153281 | 6/1999 |

* cited by examiner

*Primary Examiner*—Kevin Lee
(74) *Attorney, Agent, or Firm*—Wenderoth, Lind & Ponack, L.L.P.

(57) ABSTRACT

In a second stage of the insertion of a male coupler 1 into a female couple 2, a stationary valve member 5 of the female coupler 1 moves a secondary movable valve member 47 of the male coupler 2 rearwards relative to a primary movable valve member 38 of the same so that the front end portion of the stationary valve member 5 advances into the front end portion of the primary movable valve member 38 and, thus, the interior surface of the front end portion of the primary movable valve member 38 covers and sealingly engages a first sealing ring 13 provided on an outer peripheral portion of the front end portion of the stationary valve member 5 and, simultaneously, a front end portion of a cylindrical coupler body 31 of the male coupler overlaps the exterior surface of the front end portion of the movable valve member 15 of the female coupler so that a second sealing ring 36 provided on the interior surface of the cylindrical coupler body is covered and sealingly engaged by the exterior surface of the movable valve member 15. In a final stage of the insertion, the female and male couplers are connected with each other with the first and second sealing rings being kept covered by the front end portions of the primary movable valve member 38 and the movable valve member 15, respectively.

5 Claims, 6 Drawing Sheets

FLUID COUPLER

BACKGROUND OF THE INVENTION

The present invention relates to a fluid coupler comprising a female coupler and a male coupler, and more particularly to a fluid coupler adapted for use in the transfer of a high pressure fluid.

There is well-known type of fluid coupler in which a female coupler has both a stationary valve member and a movable valve member, and a male coupler has a movable valve member. When the male and female couplers are not connected to each other, their respective valve members function to close their respective fluid passages. Upon insertion of the male coupler into the female coupler, the movable valve member of the female coupler is pushed rearwards by the front end of the male coupler, and the movable valve member of the male coupler is similarly pushed rearwards by the stationary valve member of the female coupler, whereby the fluid passages of the female and male couplers are brought into fluid communication. In such a fluid coupler, when the female and male couplers are not connected to each other, valve members provided in the couplers cover and sealingly engage sealing rings provided on, for example, respective fluid passage walls of the respective couplers so as to prevent fluid leakage. However, a drawback of this arrangement is that when the female and male coupler s are connected to each other the sealing rings are exposed to a high pressure fluid flow passing through the fluid passages, and are therefore liable to be damaged or to become detached. With a view to overcoming this problem, the inventor of the present application has already made an invention which provides a fluid coupler wherein valve members are designed to cover and sealingly engage sealing rings when female and male coupler s are connected to each other, so as to shield the sealing rings from a high pressure fluid flow (refer to Japanese Patent Application H11-153281).

The invention referred to above avoids the problems which occur due to exposure of sealing rings to a high pressure fluid flow. However, in that invention, since the movable valve member of the female coupler has an overall cylindrical configuration and is arranged such that, when the female and male couplers are not connected, the tip end of the movable valve overlaps a small diameter portion of a stepped peripheral surface of the stationary valve member, with the tip end surface thereof being forcibly engaged with the step-connecting upright portion of the stepped peripheral surface of the stationary valve member, if a surge occurs in the pipe line system to which the female coupler is connected, the tip end of the female coupler may be deformed or otherwise damaged. Further, the structure of the fluid coupler is complicated, and is therefore costly and time-consuming to produce.

BRIEF SUMMARY OF THE INVENTION

The object of the present invention is to provide a fluid coupler having a simplified structure in which there are provided in respective female and male couplers valve members designed to shield sealing rings from a high pressure fluid flow when the respective couplers are connected to each other. Further, the present invention aims to provide a fluid coupler in which valve members are designed to prevent deformation or other damage, even in a case that a surge occurs in a pipe line system to which the couplers are connected.

In accordance with the present invention, there is provided a fluid coupler comprising a female coupler and a male coupler, wherein the female coupler comprises:

a cylindrical coupler body having an axis, a front end directed towards the male coupler, a rear end directed away from the male coupler, and interior and exterior surfaces extending between the front and rear ends;

a stationary valve member provided inside and securely connected to the cylindrical coupler body, the stationary valve member having a head positioned at or adjacent the front end of the cylindrical coupler body and a first sealing ring provided on an outer peripheral surface of the head, and, a cylindrical movable valve member having an axis in parallel with the axis of the cylindrical coupler body, a front end, a rear end, a front end portion extending from the front end towards the rear end, and exterior and interior surfaces extending between the front and rear ends, the cylindrical movable valve member being positioned between the cylindrical coupler body and the stationary valve member and axially movable between:

a closing position wherein the interior surface of the front end portion thereof covers and sealingly engage the first sealing ring of the head, and an opening position wherein the cylindrical movable valve member has been moved rearwards relative to the stationary valve member and separated from the head, the male coupler comprises:

a cylindrical coupler body having an axis, a front end directed towards the female coupler, a rear end directed away from the female coupler, a front end portion extending from the front end towards the rear end, and exterior and interior surfaces extending between the front and rear ends;

a secondary movable valve member inside the cylindrical coupler body and having a front end, a rear end, a front portion extending from the front end towards the rear end, and an exterior surface;

a cylindrical primary movable valve member having an axis in parallel with the axis of the cylindrical coupler body, a front end, a rear end, a front portion extending from the front end towards the rear end, and exterior and interior surfaces, the cylindrical primary movable valve member being positioned between the secondary movable valve member and the cylindrical coupler body of the male coupler, the exterior surface of the cylindrical primary movable valve member cooperating with the interior surface of the cylindrical coupler body to define a fluid passage of the male coupler; and, a second sealing ring provided on the interior surface of the front end portion of the cylindrical coupler body of the male coupler;

the secondary movable valve member being movable between:

a forward position at a time when the male coupler has not been inserted into the female coupler, wherein the front end thereof is positioned at or adjacent to the front end of the cylindrical coupler body and a rearward position at a time when the male coupler has been inserted into the female coupler to establish a fluid connection between the female and male couplers, the primary movable valve member being movable between:

a forward closing position at the time when the male coupler has not been inserted into the female coupler, wherein the front end portion of the primary movable valve member is positioned between the front end portion of the cylindrical coupler body having the second sealing ring and the front end portion of the secondary movable valve member and sealingly engaged with the second sealing ring; and, a rearward opening position at the time when the male coupler has been inserted into the female coupler to establish the fluid connection between the female and male couplers; wherein the front end portion of the primary movable valve member is separated rearwards from the front end portion of the cylindrical coupler body having the second sealing ring to define a fluid passage opening between the front end portion of the cylindrical coupler body and the front end portion of the primary movable valve member which opening is fluidly communicated with the fluid passage of the male coupler defined between the interior surface of the cylindrical coupler body and the exterior surface of the primary movable valve member; wherein in an initial stage of insertion of the male coupler into the female coupler, the movable and stationary valve members 5, 15 of the female coupler respectively abut and move the primary and secondary movable valve members of the male coupler rearwards relative to the cylindrical coupler body of the male coupler;

in a second stage of the insertion, the stationary valve member of the female coupler further moves said secondary movable valve member rearwards relative to the primary movable valve member so that the front end portion of the stationary valve member advances into the front end portion of the primary movable valve member and, thus, the interior surface of the front end portion of the primary movable valve member covers and sealingly engages the first sealing ring and, simultaneously, said front end portion of said cylindrical coupler body of said male coupler overlaps said exterior surface of said front end portion of said movable valve member of the female coupler so that the second sealing ring is covered and sealingly engaged by the exterior surface of the movable valve member; and, in a final stage of the insertion, the movable valve member of the female coupler is moved rearwards by the cylindrical coupler body of the male coupler to the opening position with the second sealing ring being kept engaged by the exterior surface of the movable valve member, and the primary movable member of the male coupler is moved rearwards by the stationary valve member together with the secondary valve member to the rearward opening position while keeping the first sealing ring sealingly engaged by the interior surface of the front end portion of the primary movable valve member.

BRIEF DESCRIPTION OF THE DRAWINGS

These and other objects, features, aspects, and advantages of the present invention will become apparent from the following description and claims with reference to the accompanying drawings, where:

DETAILED DESCRIPTION OF THE INVENTION

Detailed description will now be given with reference to FIG. 1, in which there is shown a fluid coupler in accordance with one embodiment of the present invention, and which comprises a female coupler 1 and a male coupler 2.

The female coupler 1 comprises: a cylindrical female coupler body, which in this embodiment consists of a cylindrical coupler member 3, with a cylindrical adapter 7 being threadably connected to a rear portion of the cylindrical coupler member 3; a stationary valve member 5 provided along a longitudinal axis of the cylindrical female coupler body 3, 7, and fixedly connected thereto; a cylindrical movable valve member 15 surrounding the stationary valve member 5; and a cylindrical valve support 4 fixedly connected to the cylindrical female coupler body 3, 7 so as to movably support in an axial direction the movable valve member 15.

The stationary valve member 5 has a head 5a at its forward end. The exterior peripheral surface of the head 5a is provided with an annular groove in which each of a sealing ring 13 and a rigid fixing ring 14 are fitted. The stationary valve member 5 also has at its backward end portion a plurality of radially extending members 5b, which define therebetween axially extending fluid passages 11; and has an annular connection member 5c surrounding and fixed to the radially extending members 5b, and which is clamped together with the valve support 4 by the coupler member 3 and the adapter 7. The fluid passages 11 fluidly connect a fluid passage 6 of the adapter 7 with a fluid passage 10 formed between the stationary valve member 5 and the movable valve member 15 to form a fluid passage of the female coupler 1. The fluid passage of the female coupler 1 has at its forward end a fluid passage opening 16 which, as explained below, is closed when the head 5a of the stationary valve member 5 is engaged with the movable valve member 15.

The movable valve member 15 is urged forwards by a coil spring 21. The valve support 4 and the movable valve member 15 have stop projections 17 and 18, respectively, which engage with each other to stop the movable member 15 at a fluid passage closing position, shown in FIG. 1, to act against an urging force of the coil spring 21. In this position the sealing ring 14 is covered and sealingly engaged by the forward end portion 15a of the movable valve member 15. In FIG. 1, reference numerals 8 and 9 respectively denote a sealing ring and a rigid fixing ring; and reference numerals 19 and 20 respectively also denote a sealing ring and a rigid fixing ring.

The female coupler 1 is further provided with a male coupler locking mechanism 23 which comprises a plurality of locking balls 24, a support 27, and a sleeve 25.

Each locking ball 24 is received in a through hole which extends in a radial direction through a wall of the coupler member 3, such that each locking ball 24 is moveable in a radial direction between a locking position (FIG. 6), in which a locking ball projects inwardly from the interior surface of the coupler member 3, and a non-locking position (FIG. 1), in which the locking ball retracts outwardly from its locking position.

The locking ball support 27 has a cylindrical body slidably engaged with the interior surface of the coupler member 3, and an annular end wall 29 provided at a front end of the cylindrical body, and extending between the interior surface of the coupler member 3 and the exterior surface of the movable valve member 15. The locking ball support 27 is urged forwards by a coil spring 28 to a forward position, as shown in FIG. 1.

Figure 1:
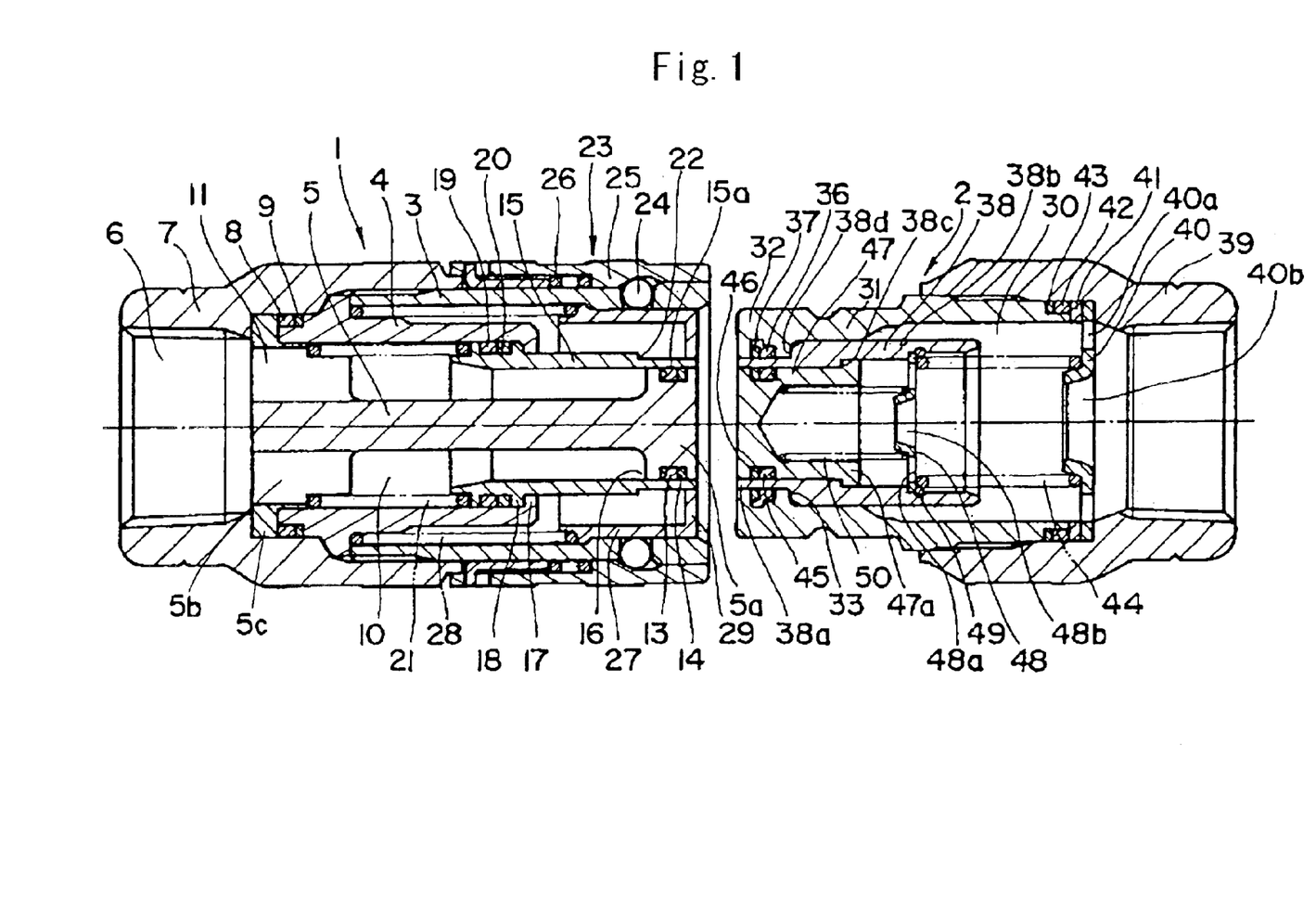
FIG. 1 is a longitudinal sectional view of a coupler in accordance with the present invention in which female and male coupler s are not connected to each other.
Figure 6:
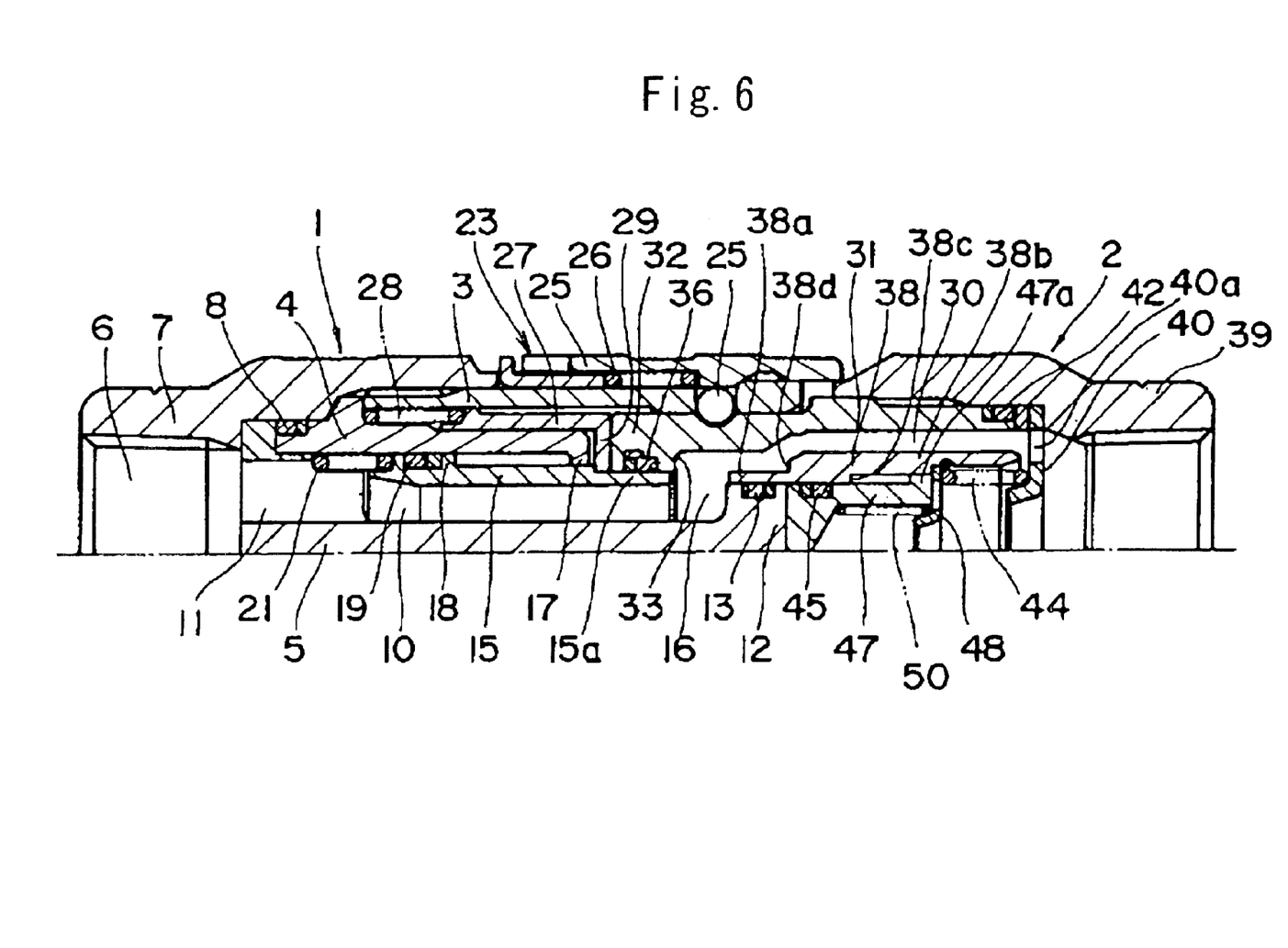
FIG. 6 is a view similar to FIG. 5 showing a final stage of insertion of the male coupler into the female coupler in which fluid passages of the male and female coupler are fluidly connected to each other.

The sleeve 25 has an annular groove formed in its interior surface, and as shown in FIG. 1, is movable in an axial direction between a position in which the locking balls 24 are engaged in the receiving groove and a non-locked position d, as shown in FIG. 6, in which the locking balls are not engaged in the receiving groove, but are pressed inwardly in an axial direction by the interior surface of the sleeve 25. The locking ball operation sleeve 25 is urged forwards by a spring 26 to the position shown in FIG. 1.

The male coupler 2 comprises a cylindrical male coupler body, which in this embodiment consists of a cylindrical coupler member 31 and a cylindrical adapter 39 threadably connected to the rear portion of the cylindrical coupler member 31, a secondary movable valve member 47 positioned inside the cylindrical coupler member 31, and a cylindrical primary movable valve member 38 positioned in an annular space formed between the secondary movable valve member 47 and the cylindrical coupler member 31.

The coupler member 31 has a stepped interior surface containing a small diameter step portion, a first step-connecting portion 33, an intermediate diameter step portion, a second step-connecting portion, and a large diameter step portion.

The primary movable valve member 38 has a stepped exterior surface containing a small diameter step portion, a step-connecting portion 38d, and a large diameter step portion, and a stepped interior surface containing a small diameter step portion, a first step-connecting portion 38c, an intermediate diameter step portion, a second step-connecting portion, and a large diameter portion.

The primary movable valve member 38 is provided with a first annular spring support 48 engaged with the second step-connecting portion of the interior surface, and fixedly held by a retainer ring 49. A second annular spring support 40 is secured between the coupler member 31 and the adapter 39. Reference numerals 40a, 40b and 48a, 48b denote through holes formed in the spring supports 40 and 48, respectively.

Between the first and second annular spring supports there is provided a coil spring 44 to urge the primary valve member 38 forwards to forcibly engage the step-connecting portion 38d of the exterior surface of the primary valve member 31 with the first step-connecting potion 33 of the interior surface of the coupler member 31. The first spring support 48 supports a coil spring 50 which urges the secondary valve member 47 forwards so that a large diameter rear end portion 47a of the secondary valve member 47 is forcibly engaged with the first step-connecting portion 38c of the interior surface of the primary valve member.

Figure 2:
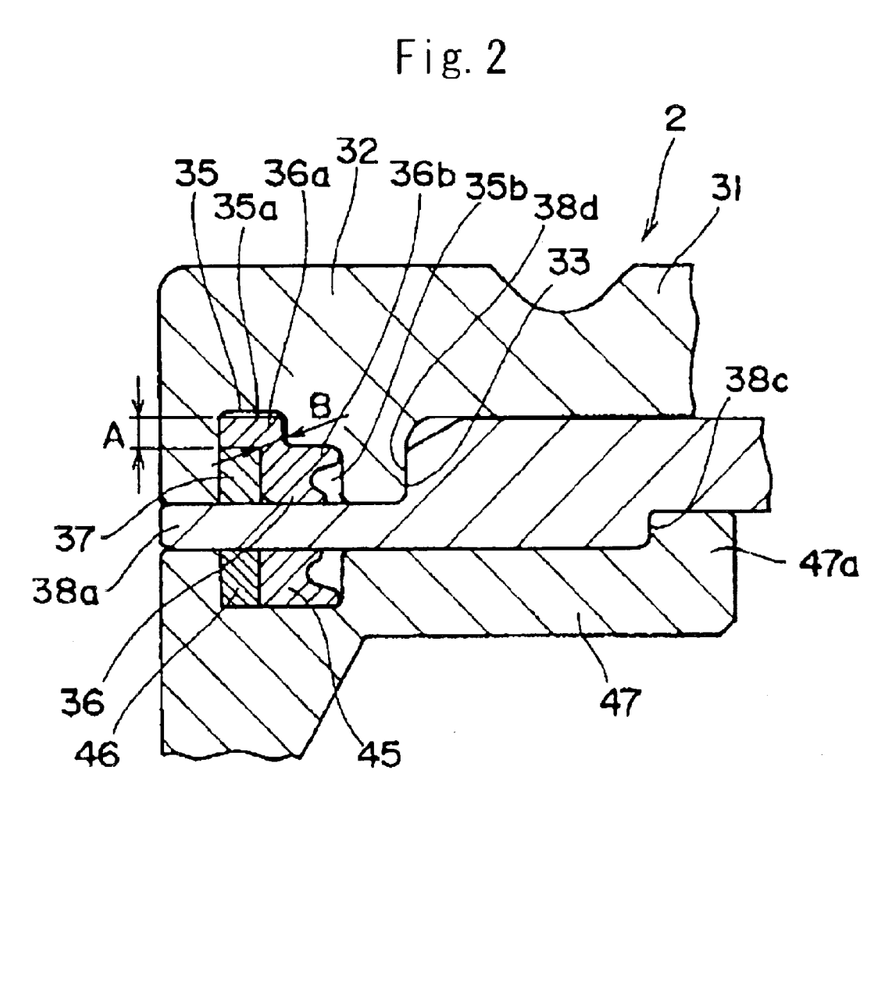
FIG. 2 is an enlarged fragmentary sectional view of a forward end portion of the male coupler of the coupler shown in FIG. 1.

As most clearly shown in FIG. 2, a front end portion 32 of the cylindrical coupler member 31 and a front end portion of the secondary valve member 47 are provided with sealing rings which sealingly engage the exterior and interior surfaces of the front end portion 38a of the primary valve member 38. Specifically, the interior surface of the front end portion of the secondary valve 47 is formed with an annular groove in which a sealing ring 45 and a rigid fixing ring 46 are placed. The interior surface of the front end portion 32 is also formed with an annular groove 35 in which a sealing ring 36 is disposed. The annular groove 35 consists of a large diameter annular portion 35a and a small diameter annular portion 35b connected to the large diameter portion 35a. The sealing ring 36 has a Y-shaped cross-section comprising a base portion 36a and a bifurcated portion 36b, wherein the base portion 36a is directed towards the front end of the cylindrical coupler body 31, 39 of the male coupler member, and the bifurcated portions 36b is directed away from the front end. The sealing ring 36 is disposed in the annular groove 35 such that the base member 36a is positioned in the large diameter portion 35b and the bifurcated portion 36a is positioned in the small diameter portion 35b. In the large diameter portion 35a of the annular groove 35, there is provided a rigid annular ring 37 for urging the base portion 36b of the sealing ring 36 radially outwardly to securely hold the sealing ring 36 in the annular groove 35. As shown in the embodiment illustrated, to securely hold the sealing ring 36, the rigid fixing ring 37 cooperates with the wall of the groove 35 to form a restricted portion in the groove 35, the width "B" of which is smaller than the width "A" of the base portion 36a of the sealing ring 36.

In FIG. 1, reference numeral 30 denotes a fluid passage of the male coupler which is, as is explained below, fluidly communicated with the fluid passage of the female coupler 1. Reference numerals 41, 42 and 43 denote a washer, a sealing ring and a rigid fixing ring, respectively.

In the illustrated coupler, spring constants of the springs 21, 44 and 50 are set as follow: spring 21>spring 44>spring 50.

Figure 3:
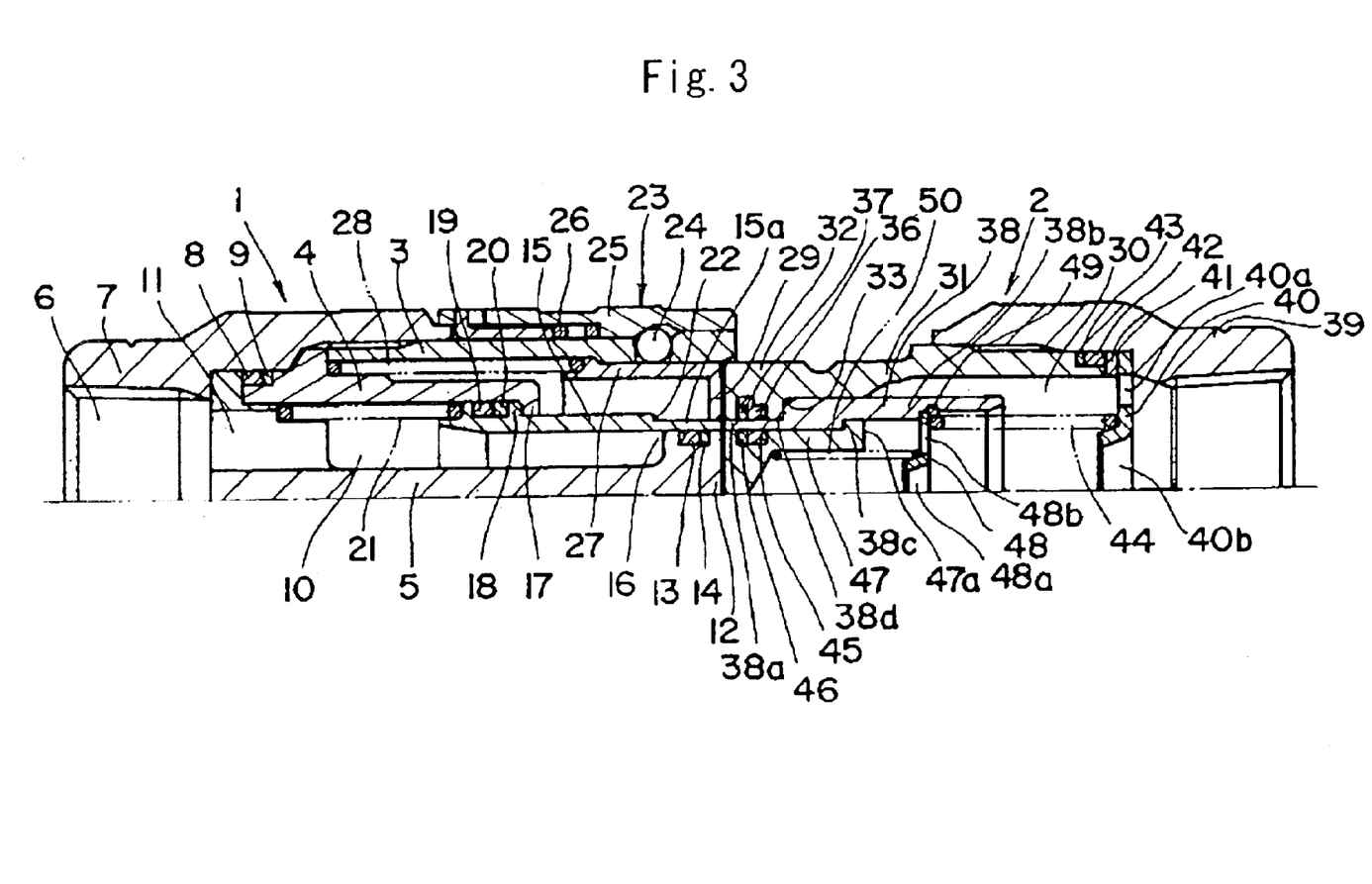
FIG. 3 is an upper half longitudinal sectional view of the coupler of FIG. 1, showing an initial stage of insertion of the male coupler into the female coupler in which valve members of the female and male coupler have been brought into contact with each other, but have not yet been engaged.
Figure 4:
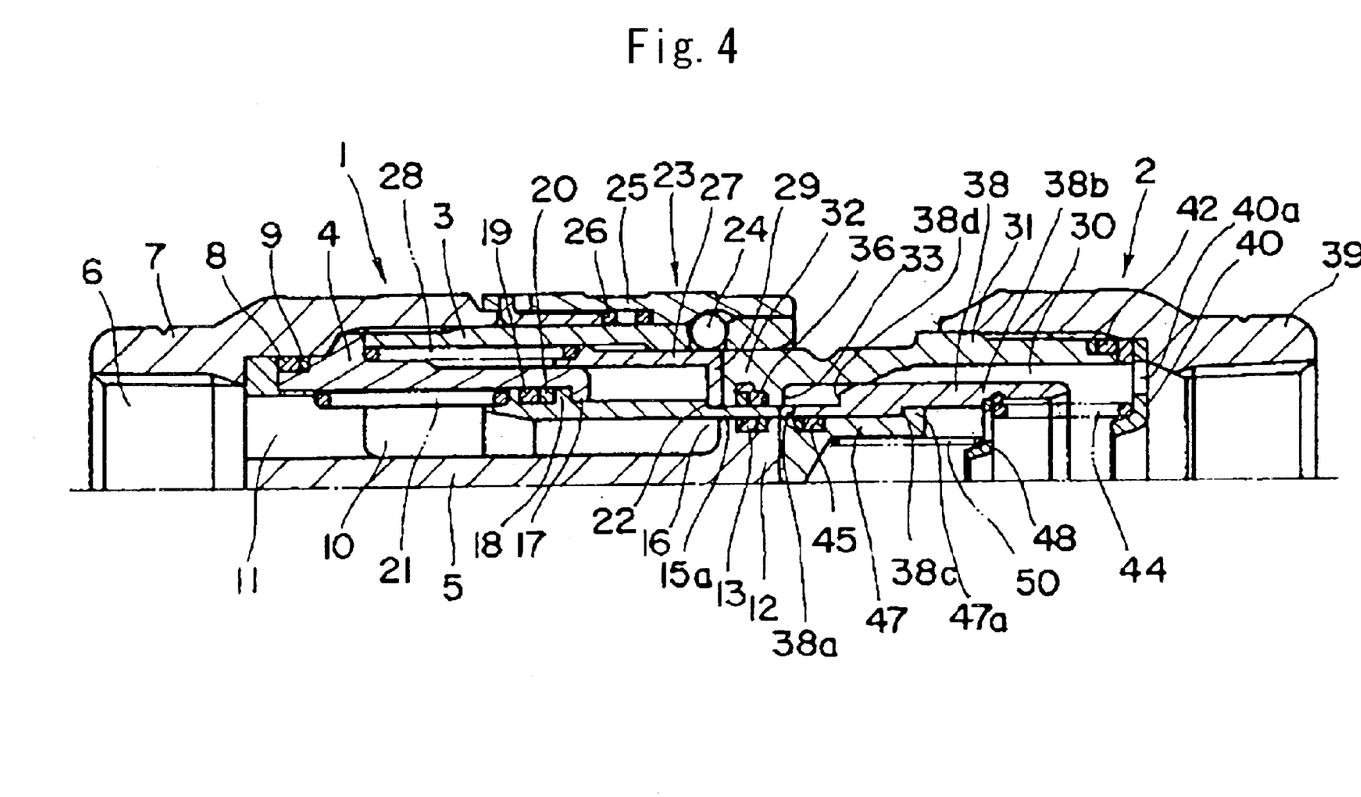
FIG. 4 is a view similar to FIG. 3 showing a state of advancement of the male coupler into the female coupler, with a movable valve member of the female coupler being pushed rearwards, and primary and secondary movable valves of the male coupler also being pushed rearwards.

Insertion of the male coupler 2 into the female coupler 1 is effected as follows:

In an initial stage, the movable valve member 5 and the stationary valve member 15 of the female coupler 1 first respectively abut the primary valve member 38 and the secondary movable valve member 47 of the male coupler (FIG. 3) and, then, move these members rearwards relative to the male coupler body (FIG. 4). At the same time, the forward end of the coupler member 31 first abuts the locking ball support 27 (FIG. 3) and, then, pushes it rearwards relative to the female coupler body (FIG. 4).

As the coupler member 31 of the male coupler 2 advances, the locking ball support 27 is moved to a position shown in FIG. 4 in which the locking ball support 27 comes into contact with a step-connecting portion 22 of the stepped exterior surface of the movable valve member 15. At this stage, the front end portion 32 of the coupler member 31 overlaps the small diameter portion 15a of the movable valve member 15 to cover and sealingly engage the sealing ring 13 provided on the small diameter portion 15a.

Figure 5:
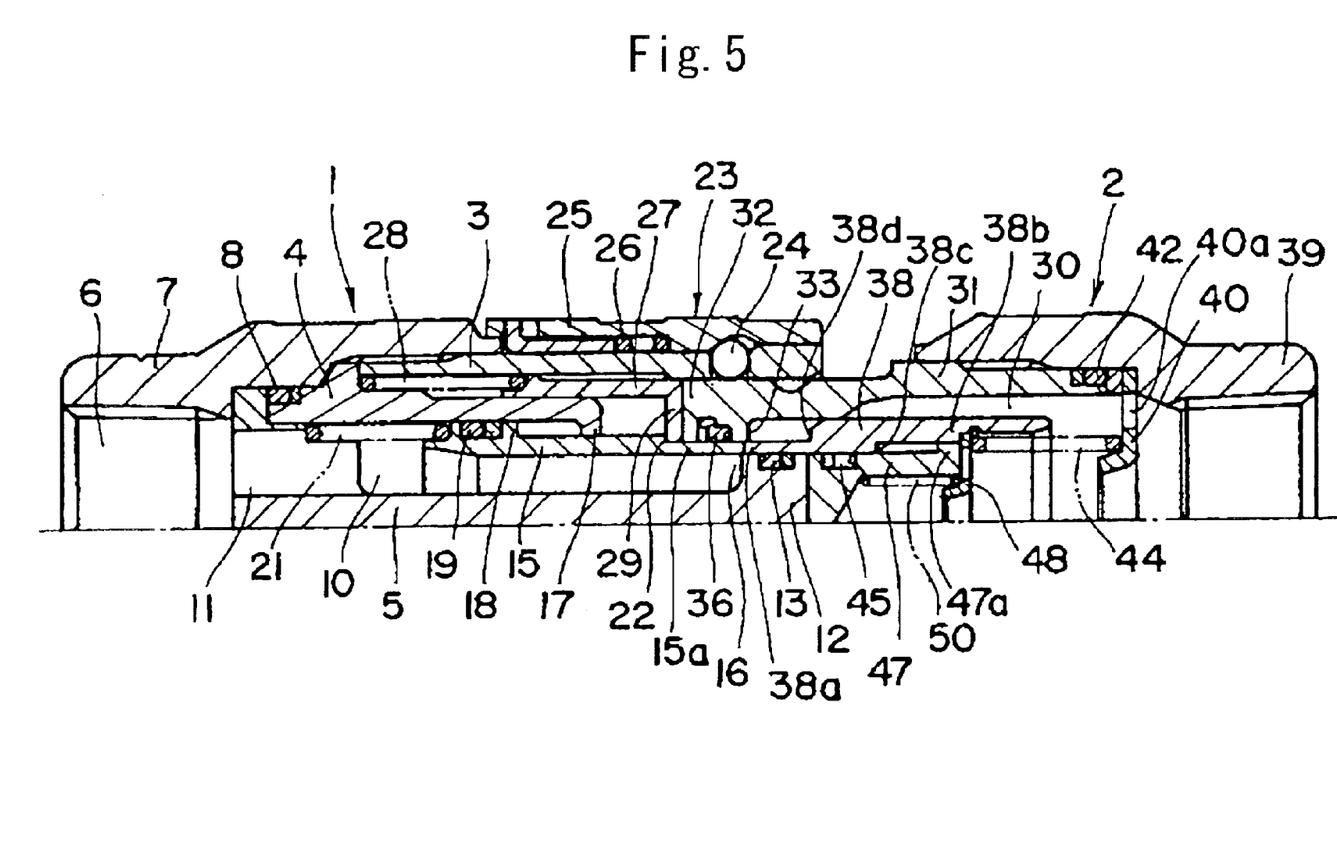
FIG. 5 is a view similar to FIG. 4 showing a further state of advancement of the male coupler into the female coupler wherein a sealing ring of the male coupler is covered and sealingly engaged by the movable valve member of the female coupler, and also a sealing ring of the female coupler is covered and sealingly engaged by the primary movable valve member of the male coupler.

Upon further insertion of the male coupler 2, the front end of the coupler member 31 pushes the movable valve member 15 rearwards together with the locking ball support 27. At this stage, the primary movable valve member 38 of the male coupler 2 is relieved of any rearward-acting force applied by the movable valve member 15. Since the Young's modulus of the coil spring 44 is set to be larger than that of the coil spring 50, as the stationary valve 5 advances into the male coupler 2, the secondary movable valve member 47 is moved rearwards, while compressing the coil spring 50, relative to the primary movable valve member 38 which is supported by the coil spring 44, until the secondary movable valve member 47 comes into engagement with the spring support 48, whereby the sealing ring 13 provided on the outer peripheral surface of the head 5a of the stationary valve 5 is, as shown in FIG. 5, covered and sealingly engaged by the interior surface of the primary movable valve member 38 (FIG. 5).

Upon a still further insertion of the male coupler 2, the stationary valve member 5 moves the primary and secondary movable valve members 38, 47 while compressing the coil spring 44 and, simultaneously, the front end portion 32 of the coupler member 31 further moves the movable valve member 15 while compressing the spring 21, so that the fluid passage opening 16 is opened.

FIG. 6 shows a final stage of insertion of the male coupler in which the fluid passages of the female and male couplers are completely connected via the fluid passage opening 16, while the sealing rings 13 and 36 are shielded from the fluid passages. Further, the locking balls are received in the groove formed in the exterior surface of the coupler member 31, and are securely held in the groove by the sleeve 25.

When the male coupler is removed from the female coupler, the sleeve 25 is moved leftwards into radial alignment with the receiving groove formed in the interior surface of the sleeve 25 along with the locking balls 24. The male coupler 2 is then able to be removed from the female coupler 1. The process of removal of the male coupler proceeds in reverse order through the steps of insertion of the male couple member detailed above; and in this way the sealing rings are continually shielded from the fluid passages.

The invention has been described in an illustrative manner, and it is to be understood that the terminology that has been used is intended to be in the nature of words of description rather than of limitation.

Obviously, many modifications and variations of the present invention are possible in light of the above teaching of the present invention.

What is claimed is:

1. A fluid coupler comprising a female coupler 1 and a male coupler, wherein said female coupler 1 comprises:
a cylindrical coupler body, having an axis, a front end directed towards said male coupler, a rear end directed away from said male coupler, and interior and exterior surfaces extending between said front and rear ends;
a stationary valve member provided inside and securely connected to said cylindrical coupler body, said stationary valve member having a head positioned at or adjacent said front end of said cylindrical coupler body and a first sealing ring provided on an outer peripheral surface of said head, and,
a cylindrical movable valve member having an axis in parallel with said axis of said cylindrical coupler body, a front end, a rear end, a front portion extending from said front end towards said rear end, and exterior and interior surfaces extending between said front and rear ends, said cylindrical movable valve member being positioned between said cylindrical coupler body and said stationary valve member and axially movable between:
a closing position wherein said interior surface of said front end portion thereof covers and sealingly engage said first sealing ring of said head, and
an opening position wherein said cylindrical movable valve member has been moved rearwards relative to said stationary valve member and separated from said head, said male coupler comprises:
a cylindrical coupler body, having an axis, a front end directed towards said female coupler, a rear end directed away from said female coupler, a front end portion extending from said front end towards said rear end, and exterior and interior surfaces extending between said front and rear ends;
a secondary movable valve member inside said cylindrical coupler body and having a front end, a rear end, a front portion extending from said front end towards said rear end, and an exterior surface;
a cylindrical primary movable valve member having an axis in parallel with said axis of said cylindrical coupler body, a front end, a rear end, a front portion extending from said front end towards said rear end, and exterior and interior surfaces, said cylindrical primary movable valve member being positioned between said secondary movable valve member and said cylindrical coupler body, of said male coupler, said exterior surface of said cylindrical primary movable valve member cooperating with said interior surface of said cylindrical coupler body to define a fluid passage of said male coupler; and,
a second sealing ring provided on said interior surface of said front end portion of said cylindrical coupler body of said male coupler;
said secondary movable valve member being movable between:
a forward position at a time when said male coupler has not been inserted into said female coupler, wherein said front end thereof is positioned at or adjacent to said front end of said cylindrical coupler body and
a rearward position at a time when said male coupler has been inserted into said female coupler to establish a fluid connection between said female and male couplers,
said primary movable valve member being movable between:
a forward closing position at the time when said male coupler has not been inserted into said female coupler, wherein said front end portion of said primary movable valve member is positioned between said front end portion of said cylindrical coupler body, having said second sealing ring and said front end portion of said secondary movable valve member and sealingly engaged with said second sealing ring; and,
a rearward opening position at the time when the male coupler has been inserted into said female coupler to establish said fluid connection between said female and male couplers, wherein said front end portion of said primary movable valve member is separated rearwards from said front end portion of said cylindrical coupler body having said second sealing ring to define a fluid passage opening between said front end portion of said cylindrical coupler body and said front end portion of said primary movable valve member which opening is fluidly communicated with said fluid passage of said male coupler defined between said interior surface of said cylindrical coupler body and said exterior surface of said primary movable valve member;

wherein in an initial stage of insertion of the male coupler into said female coupler, said movable and stationary valve members, of said female coupler respectively abut and move said primary and secondary movable valve members, of said male coupler rearwards relative to said cylindrical coupler body of said male coupler;

in a second stage of said insertion, said stationary valve member of said female coupler further moves said secondary movable valve member rearwards relative to said primary movable valve member so that the front end portion of said stationary valve member advances into said front end portion of said primary movable valve member and, thus, the interior surface of said front end portion of said primary movable valve member covers and sealingly engages said first sealing ring and, simultaneously, said front end portion of said cylindrical coupler body, of said male coupler overlaps said exterior surface of said front end portion of said movable valve member of said female coupler so that said second sealing ring is covered and sealingly engaged by said exterior surface of said movable valve member; and, in a final stage of said insertion, said movable valve member of said female coupler is moved rearwards by said cylindrical coupler body, of said male coupler to said opening position with said second sealing ring being kept engaged by said exterior surface of said movable valve member, and said primary movable member of said male coupler is moved rearwards by said stationary valve member together with said secondary valve member to said rearward opening position while keeping said first sealing ring sealingly engaged by said interior surface of said front end portion of said primary movable valve member.

2. A fluid coupler as set forth in claim 1 wherein
said secondary movable valve member is, in said final stage, engaged with said primary movable valve member and, then, moved rearwards by said stationary valve member together with said primary movable valve member.

3. A fluid coupler as set forth in claim 2 further comprising:
a first spring urging said cylindrical movable valve members of said female coupler to said closing position;
a second spring urging said primary movable valve member of said male coupler to said forward closing position; and,
a third spring provided between said primary movable valve member and said secondary movable valve member so as to urge said secondary movable valve member to said forward position;
wherein spring constants of said first, second and third springs are set as:
first spring>second spring>third spring.

4. A fluid coupler as set forth in claim 2 wherein
said female coupler further comprises:
a locking ball held by said cylindrical coupler body of said female coupler in such a manner that the locking ball is movable between a locking position wherein said locking ball partly projects radially inwardly from the interior surface of said cylindrical coupler body and a non-locking position wherein said locking ball is retracted radially outwardly from said locking position; and,
a locking ball support member positioned between said cylindrical coupler body and said cylindrical movable valve member of said female coupler and having a cylindrical body slidably engaged with said interior surface of said cylindrical coupler body, and an annular end wall provided at a front end of said cylindrical body and extending between said interior surface of said cylindrical coupler body, and said exterior surface of said front portion of said cylindrical movable valve member of said female coupler,
wherein said exterior surface of said cylindrical movable valve member of said female coupler has a small diameter front portion extending rearwards from said front end of the movable valve member, a large diameter portion and an intermediate portion connecting said small diameter front portion and said large diameter portion, the intermediate portion being engaged by said annular end wall of said locking ball support member which has been moved rearwards by said front end of said cylindrical coupler body of said male coupler in said second stage of said insertion of said male coupler into said female coupler; and,
said front end portion of said cylindrical coupler body, of said male coupler is sized to be inserted into an annular space formed between said interior surface of said cylindrical coupler body of said female coupler and said small diameter front end portion of said exterior surface of said movable valve member and is provided on its exterior surface with an annular recess which receives said locking ball at the time when said male coupler has been inserted into said female coupler to fluidly connect the female and male couplers.

5. A fluid coupler as set forth in claim 4 wherein
said interior surface of said front end portion of said cylindrical coupler body, of said male coupler is provided with an annular groove for receiving said second sealing ring, said annular groove comprising a small diameter annular portion and a large diameter annular portion which is closer to said front end of said cylindrical coupler body, of said male coupler than said small diameter portion and connected to said small diameter portion;
said second sealing ring has a Y-shaped cross-section comprising a base portion and a bifurcated portion wherein the base portion is directed towards said front end of said cylindrical coupler body, of said male coupler and said bifurcated portion directed away from said front end, said second sealing ring being disposed in said annular groove in such a manner that said base portion is positioned in said large diameter portion and said bifurcated portion is positioned in said small diameter portion; and,
said male coupler further comprises an annular rigid ring disposed in said large diameter portion of said annular groove in such a manner that the annular rigid ring urges said base portion of said second sealing ring radially outwardly to securely hold said second sealing ring in said annular groove.

* * * * *